United States Patent
Kwon (10) Patent No.: US 10,200,090 B2
(45) Date of Patent: Feb. 5, 2019

(54) METHOD AND APPARATUS FOR OPERATING NEAR FIELD COMMUNICATION FUNCTION IN A PORTABLE TERMINAL

(71) Applicant: Samsung Electronics Co., Ltd., Suwon-si, Gyeonggi-do (KR)

(72) Inventor: Taeho Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 14/155,761

(22) Filed: Jan. 15, 2014

(65) Prior Publication Data

US 2014/0197927 A1    Jul. 17, 2014

(30) Foreign Application Priority Data

Jan. 15, 2013  (KR) ........................ 10-2013-0004458

(51) Int. Cl.
| | |
|---|---|
| *H04B 5/02* | (2006.01) |
| *H04B 5/00* | (2006.01) |
| *H04W 48/02* | (2009.01) |
| *H04W 4/80* | (2018.01) |

(52) U.S. Cl.
CPC .......... *H04B 5/0062* (2013.01); *H04W 48/02* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2009/0231109 A1* | 9/2009 | Reichert | G06K 7/0008 340/10.41 |
| 2011/0234379 A1* | 9/2011 | Lee | H04M 1/72519 340/10.1 |
| 2012/0090033 A1* | 4/2012 | Kelly | G06F 21/34 726/26 |
| 2012/0252420 A1 | 10/2012 | Czaja et al. | |

FOREIGN PATENT DOCUMENTS

| | | |
|---|---|---|
| EP | 2 493 232 A1 | 2/2011 |
| KR | 10-0926165 B1 | 11/2009 |
| WO | 2009/045085 A1 | 4/2009 |
| WO | 2012/155026 A1 | 11/2012 |

* cited by examiner

*Primary Examiner* — James J Yang
*Assistant Examiner* — Kevin Lau
(74) *Attorney, Agent, or Firm* — Jefferson IP Law, LLP (57) ABSTRACT

A method of operating a Near Field Communication (NFC) function in a portable terminal is provided. The method includes detecting an NFC tag during execution of a particular mode, comparing the NFC tag with preset lists, omitting a reading operation of the NFC tag if the NFC tag is an NFC tag which is included in a blocking list, and reading the NFC tag if the NFC tag is an NFC tag which is included in an application mapping list.

16 Claims, 7 Drawing Sheets

METHOD AND APPARATUS FOR OPERATING NEAR FIELD COMMUNICATION FUNCTION IN A PORTABLE TERMINAL

CROSS-REFERENCE TO RELATED APPLICATION(S)

This application claims the benefit under 35 U.S.C. § 119(a) of a Korean patent application filed on Jan. 15, 2013 in the Korean Intellectual Property Office and assigned Serial No. 10-2013-0004458, the entire disclosure of which is hereby incorporated by reference.

TECHNICAL FIELD

The present disclosure relates to a method and apparatus for performing a function of a portable terminal. More particularly, the present disclosure relates to a method and apparatus for operating a Near Field Communication (NFC) function.

BACKGROUND

Along with recent developments in digital technologies, various user devices capable of communicating and processing personal information while moving, such as a mobile communication terminal, a Personal Digital Assistant (PDA), an electronic organizer, a smart phone, and a tablet Personal Computer (PC), have been introduced. Such user devices do not remain in traditional unique areas, but are reaching a mobile convergence phase that covers areas of other terminals. For example, a portable terminal may include various functions, such as a calling function including a voice call and a video call, a message transmission and reception function including a Short Message Service (SMS)/Multimedia Message Service (MMS) function, an e-mail function, a navigation function, a photographing function, a broadcast replay function, a media (moving image and music) replay function, an Internet function, a messenger function, and a Social Network Service (SNS) function.

Recently, as an NFC module has been implemented in portable terminals, certain portable terminals can now perform an NFC service. A portable terminal including a current NFC module reads information from a tag for NFC or transmits information to, and receives information from, another portable terminal including an NFC module.

For example, if an NFC tag approaches a portable terminal that includes a current NFC function, an application for reading information of the NFC tag is executed in the portable terminal, and information stored in the NFC tag may be read by recognizing the NFC tag through the certain application.

Likewise, in the related art, if there is an NFC tag near a portable terminal, an application for NFC tag recognition may be automatically executed unnecessarily, even in a situation in which a user does not desire to recognize the NFC tag. Hence, an unnecessary NFC link operation that is not intended by a user may be performed. For example, when a user puts a credit card having an NFC tag function in their wallet and carries a portable terminal including an NFC function, an operation for NFC recognition (e.g., the execution of an application for NFC recognition, NFC recognition, and an output of a function related with NFC recognition) may be unnecessarily performed.

Therefore, a need exists for an NFC service solution for resolving the inconvenience experienced by a user due to a misapplication of an NFC service that recognizes an NFC tag.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for operating a Near Field Communication (NFC) function in a portable terminal which may support an NFC service for improvement of user convenience in a portable terminal having an NFC function.

Another aspect of the present disclosure is to provide a method and apparatus for operating an NFC function in a portable terminal which blocks an execution of an unnecessary NFC application by setting in advance whether the NFC function is activated.

Still another aspect of the present disclosure is to provide a method and apparatus for operating an NFC function in a portable terminal which avoids an NFC tag which is not desired by a user, and which allows for an automatic execution of an optimal application according to a user's setting in regard to an NFC tag which is desired by a user.

Yet another aspect of the present disclosure is to provide a method and apparatus for operating an NFC function in a portable terminal which may omit a reading of an NFC tag, or may automatically execute an optimal application corresponding to an NFC tag, depending on allowed/restricted information of the NFC tag which is set in a portable terminal including an NFC function.

Another aspect of the present disclosure is to provide a method and an apparatus for operating an NFC function in a portable terminal which improves user convenience and usability of the portable terminal by implementing an optimal environment for supporting an NFC service in a portable terminal including an NFC function.

In accordance with an aspect of the present disclosure, a method of operating an NFC function in a portable terminal is provided. The method includes detecting an NFC tag during execution of a particular mode, comparing the NFC tag with preset lists, omitting a reading operation of the NFC tag if the NFC tag is an NFC tag which is included in a blocking list, and reading the NFC tag if the NFC tag is an NFC tag which is included in an application mapping list.

In accordance with another aspect of the present disclosure, a method of operating an NFC function in a portable terminal is provided. The method includes detecting an NFC tag during an execution of a particular mode, reading the NFC tag through an NFC application currently being executed if the particular mode is an NFC application mode, checking the NFC tag if the particular mode is an idle mode or is a normal application mode, determining whether the NFC tag is an NFC tag of an allowed object or is an NFC tag of a blocked object, reading the NFC tag by executing an NFC application which is matched to the NFC tag if the NFC tag is the NFC tag of the allowed object, and maintaining the particular mode without executing the NFC application if the NFC tag is the NFC tag of the blocked object.

In accordance with another aspect of the present disclosure, a computer-readable recording medium on which a program for executing the method in a processor is recorded is provided.

In accordance with another aspect of the present disclosure, a portable terminal is provided. The portable terminal includes an NFC module configured to sense an approach of an NFC tag and to read information stored in the NFC tag, a storage unit configured to store a plurality of NFC applications, a blocking list, and an application mapping list, and a controller configured to compare the NFC tag with the blocking list and with the application mapping list when the NFC tag is detected through the NFC module, to block a reading operation of the NFC tag when the NFC tag is included in the blocking list, and to read the NFC tag by executing the NFC application matched to the NFC tag when the NFC tag is included in the application mapping list.

In accordance with another aspect of the present disclosure, a computer-readable recording medium is provided. The computer-readable recording medium has recorded thereon a program that determines a particular mode when an NFC tag is detected during an execution of the particular mode, reads the NFC tag through an NFC application currently under execution if the particular mode is an NFC application mode, checks the NFC tag if the particular mode is an idle mode or a normal application mode, reads the NFC tag by executing the NFC application matched to the NFC tag if the NFC tag is an NFC tag of an allowed object, and maintains the particular mode without executing the NFC application if the NFC tag is an NFC tag of a blocked object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
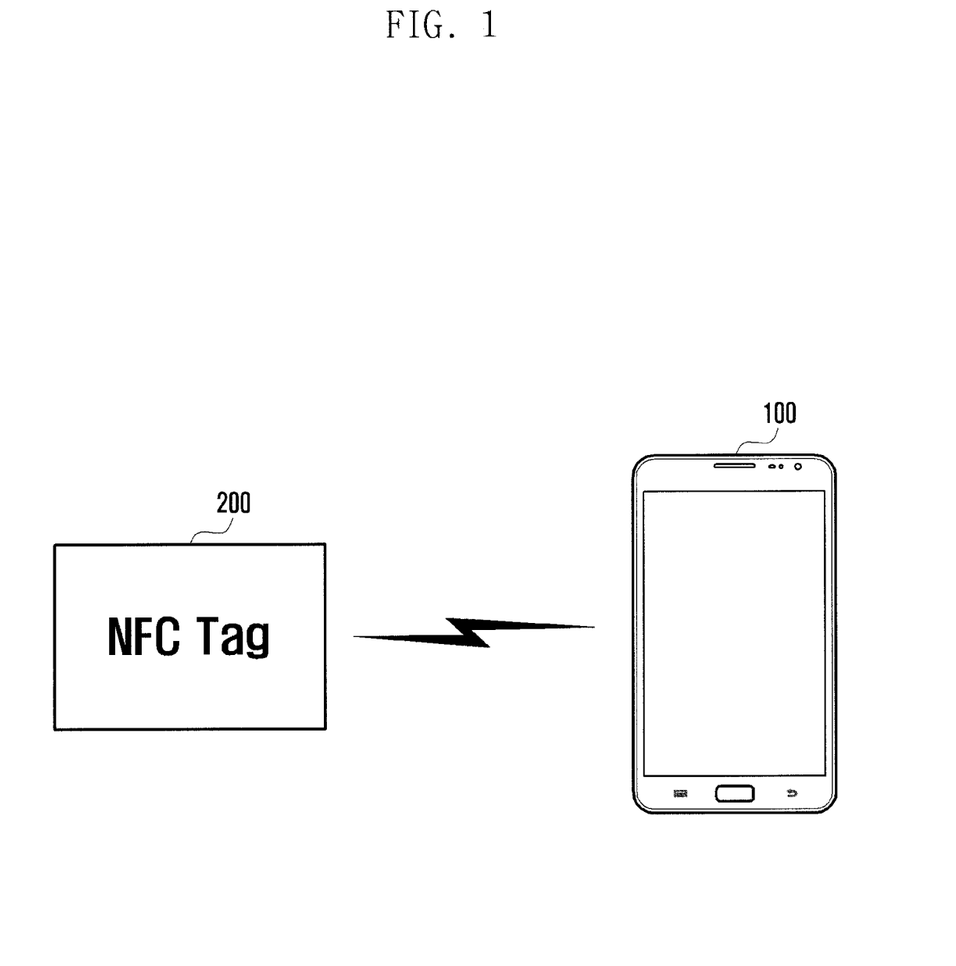
FIG. 1 schematically illustrates a basic configuration of a Near Field Communication (NFC) service system using an NFC tag according to an embodiment of the present disclosure.

FIG. 1 schematically illustrates a basic configuration of a Near Field Communication (NFC) service system using an NFC tag according to an embodiment of the present disclosure.

Referring to FIG. 1, the system includes a portable terminal 100 and an NFC tag 200, and supports an NFC service through this configuration.

NFC is a Radio Frequency IDentification (RFID) technology and is a non-contact type short range wireless communication technology that uses the 13.56 MHz frequency band. Since NFC has a short communication distance (e.g., 10 cm), NFC provides superior security and is inexpensive, thereby attracting attention as a next-generation short range communication technology. NFC may provide both reading and writing functions, and is similar to conventional short range communication technologies, such as Bluetooth, but does not require setting between devices as in Bluetooth.

An NFC service that uses such NFC is widely used in the transmission of goods and other kinds of information (e.g., traveling information, parking information, location guide information, or the like) for visitors, for traffic, for entrance control locks, or the like, and in various places (e.g., a department store, a shop, a parking lot, a tourist attraction, a museum, or the like).

The portable terminal 100 is a device carried by a user, may input information in an NFC tag 200, and includes an NFC module for reading information stored in the NFC tag 200. The portable terminal 100 may include a plurality of NFC applications for reading information stored in an NFC tag which is sensed through the NFC module in an embodiment of the present disclosure.

The portable terminal 100 according to an embodiment of the present disclosure may include any device that uses an application processor, a Graphic Processing Unit (GPU), and a Central Processing Unit (CPU), such as any information communication device, any multimedia device, and any application devices thereof which support the functions of the present disclosure. For example, the portable terminal may include a device such as a tablet personal computer, a smart phone, a digital camera, a portable multimedia player (e.g., an MP3 player), a portable game console, and a personal digital assistant, as well as mobile communication terminals operated according to respective communication protocols corresponding to various communication systems. A configuration of a portable terminal of the present disclosure will be described with reference to FIG. 2.

The NFC tag 200 is a kind of a memory device, and may store information. For example, the NFC tag 200 may store a service identifier (e.g., a unique identifier) and service data (e.g., NFC data exchange format data).

Likewise, according to an embodiment of the present disclosure including a portable terminal 100 and an NFC tag 200, the portable terminal 100 may detect an approach of the NFC tag 200 through the NFC module in an idle state, or an operation state of a certain mode (e.g., an application execution mode such as a calling mode, a message mode, a chatting mode, and a web browsing mode, or the like, except for a mode in which an NFC application is being executed).

The portable terminal 100 may determine whether the NFC tag 200 corresponds to an NFC tag (or function) included in the blocking list. In an embodiment, when the NFC tag 200 corresponds to the NFC tag (or function) which is registered in the blocking list, the portable terminal 100 blocks a search for, and an execution of, the NFC application related with the NFC tag 200. Hence, the portable terminal 100 may maintain the idle state without performing any operation for an approach of the NFC tag 200 when in the idle state. In an embodiment, the portable terminal 100 may maintain an operation of a particular mode which is being currently operated without performing any operation for the approach of the NFC tag 200. That is, if the NFC tag 200 is not intended by to be recognized by a user, it may nonetheless be unnecessarily recognized, and yet the execution of the related NFC application may still be prevented.

When the approached NFC tag 200 is not included in the blocking list, the portable terminal 100 may determine whether the NFC tag 200 corresponds to the NFC tag (or function) included in the application mapping list. In an embodiment, when the NFC tag 200 corresponds to the NFC tag (or function) registered in the application mapping list, the portable terminal 100 executes the NFC application matched with the NFC tag 200. That is, according an embodiment of the present disclosure, convenience may be provided to a user by executing the NFC application corresponding to each NFC tag. In an embodiment of the present disclosure, an NFC application matched to each NFC tag may be defined based on a user's setting.

In an embodiment, when the approached NFC tag 200 is not included in either of the blocking list and the application mapping list, the portable terminal 100 may provide a blocking item which may be promptly registered as the application list of NFC applications related with the operation of the NFC function stored (or installed) in the portable terminal 200, and the blocking list of the NFC tag 200. In an embodiment, if an input for selecting the blocking item is received from a user, the portable terminal 100 may determine that a user does not want recognition of the NFC tag 200, and adds the NFC tag 200 to the blocking list to be registered.

In contrast, if an input of selecting a particular NFC application is received from an application of the NFC application, the portable terminal 100 matches the NFC application which is selected in the NFC tag 200, and stores the matching result. That is, the NFC tag 200 and the selected NFC application are added to the application mapping list so as to be registered. When a particular NFC application is selected in the application list, the portable terminal 100 may output a pop-up that confirms whether to designate the selected NFC application as a basic application for the NFC tag 200, and execute the function corresponding to the user selection from the pop-up. For example, when a user makes a choice of designating the selected NFC application as the basic application for the NFC tag 200, the NFC tag 200 may be matched with the NFC application and the matching result may be registered in the application mapping list. When the NFC application is registered, the portable terminal 100 may promptly execute the NFC application. In contrast, when a user decides not to designate the selected NFC application as the basic application for the NFC tag 200, the NFC application may be executed without a separate registration procedure or may terminate the NFC tag 200 and NFC application registration procedure.

In an embodiment, in an NFC operation mode state where a particular NFC application related with the NFC function operation is being executed, if the NFC tag 200 is detected, the NFC tag 200 may be recognized and read through a particular NFC application which is being executed regardless of whether the blocking list or application mapping list for the NFC tag 200 has been registered.

Likewise, the portable terminal 100 of the present disclosure may detect an approached NFC tag 200 in an idle state or in a state where an application other than the NFC application is being operated. In an embodiment, when the detected NFC tag 200 is included in the blocking list, the portable terminal 100 may prevent the automatic execution of the NFC application for recognition and reading of the NFC tag 200. In an embodiment, when the NFC tag 200 is included in the application mapping list, the portable terminal may automatically execute the most appropriate NFC application for recognition and reading of the NFC tag 200. Here, the most appropriate NFC application may be an NFC application which has been mapped in advance for the NFC tag 200. In an embodiment, when the NFC tag 200 is not included in the blocking list and in the application mapping list, the portable terminal 100 may additionally register the NFC tag 200 in the blocking list or may match the NFC tag 200 with a particular NFC application and additionally register the matching result in the application mapping list according to a user's selection. That is, a user may add the NFC tag 200 to the blocking list to prevent automatic recognition of the NFC tag 200, or may designate the NFC application matched with the NFC tag 200 and add the designated NFC application to the application mapping list so that the NFC tag 200 may be automatically recognized by the most appropriate NFC application. In an embodiment, the portable terminal 100 may update the blocking list and the application mapping list in response to a user's request. That is, a user may correct, add, and delete information related to the NFC or the NFC function within the blocking list, and may correct, add, and delete information related to the NFC application for each NFC tag (or each NFC function) within the application mapping list.

Hereinafter, a configuration of the portable terminal 100 and a method of controlling an operation of the portable terminal 100 according to an embodiment of the present disclosure will be described with reference to the attached drawings. The configuration of the portable terminal 100 and the method of controlling operation of the portable terminal 100 according to an embodiment of the present disclosure are not limited to the descriptions below, and may be applied to various other embodiments based on the various embodiments described below.

Figure 2:
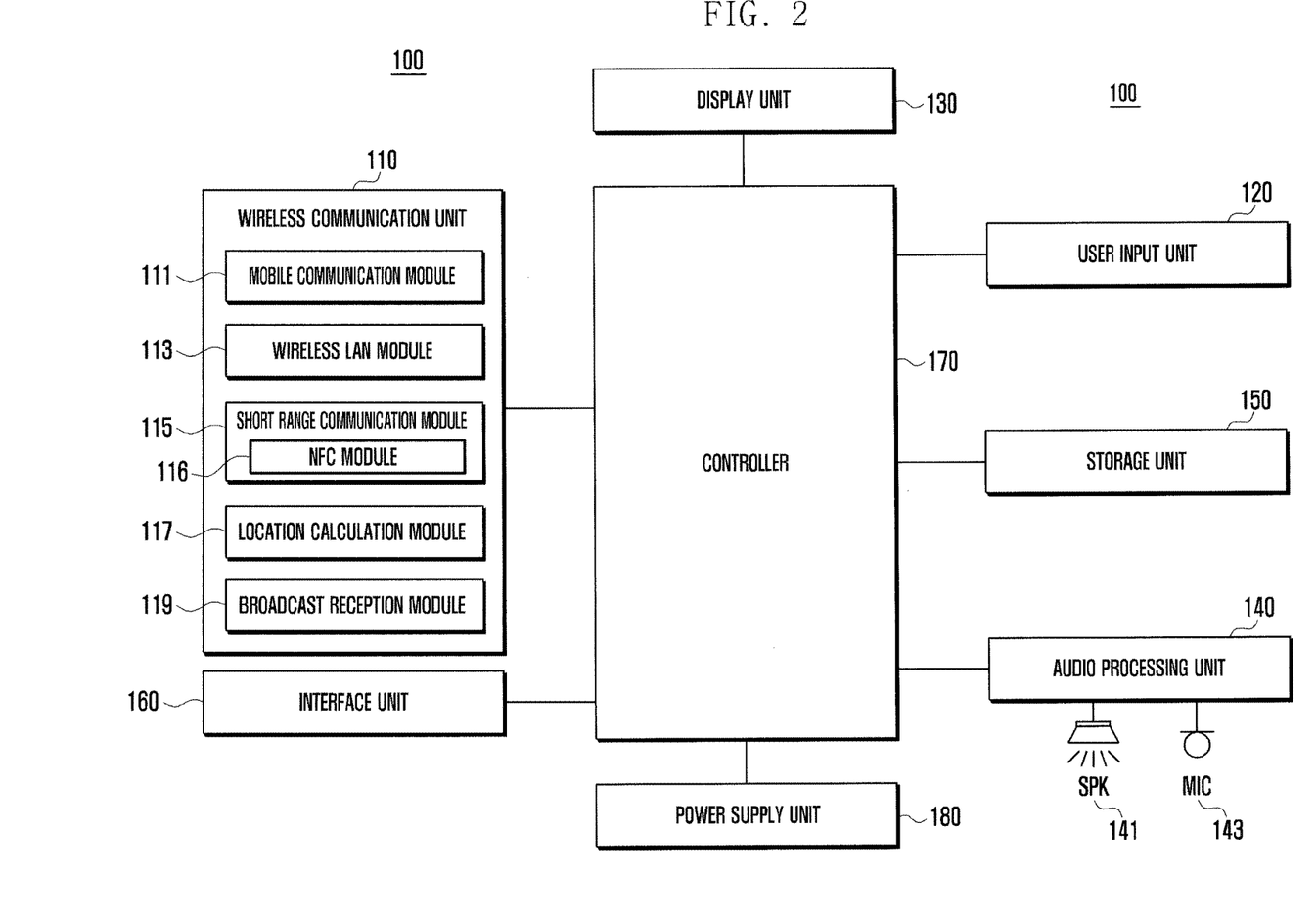
FIG. 2 schematically illustrates a configuration of a portable terminal according to an embodiment of the present disclosure.

FIG. 2 schematically illustrates a configuration of a portable terminal according to an embodiment of the present disclosure.

Referring to FIG. 2, the portable terminal 100 includes a wireless communication unit 110, a user input unit 120, a display unit 130, an audio processing unit 140, a storage unit 150, an interface unit 160, a controller 170, and a power supply unit 180. The components of the portable terminal 100 described in FIG. 2 are not essential, and thus more or fewer components may be used to implement the portable terminal 100. For example, when the portable terminal supports a photographing function, a camera module may be further included, and when the portable terminal does not support a mobile communication function, some components (e.g., a mobile communication module) of the wireless communication unit 110 may be omitted.

The wireless communication unit 110 may include one or more modules which enable wireless communication between the portable terminal 100 and the wireless communication system or wireless communication between the portable terminal 100 and another portable terminal. For example, the wireless communication unit 110 may include a mobile communication module 111, a Wireless Local Area Network (WLAN) module 113, a short range communication module 115, a location calculation module 117, and a broadcast reception module 119.

The mobile communication module 111 may transmit wireless signals to or receive wireless signals from at least one of a base station, an external terminal, and a server. The wireless signals may include various forms of data according to a transmission and reception of voice call signals, of video call signals, or of text/multimedia messages. The mobile communication module 111 may connect to a server, such as a market, according to control of the controller 170, and may download information on various NFC tags and an NFC application, or the like for recognition of NFC tags. In an embodiment, the mobile communication module 111 may transmit a setting list (e.g., a blocking list, an application mapping list, or the like) related with allowance/restriction of the NFC tag to a cloud server or download the setting list from the cloud server through a wireless LAN.

The wireless LAN module represents a module for connecting to wireless Internet and forming a wireless LAN link with another portable terminal, and may be internally or externally mounted on the portable terminal 100. Some examples of the wireless Internet technology are Wi-Fi, wireless broadband (Wibro), World interoperability for microwave access (Wimax), and High Speed Downlink Packet Access (HSDPA). The wireless LAN module 113 may connect to a server such as a market according to control of the controller 170, and download information on various NFC tags and an application for NFC tag recognition, or the like. In an embodiment, when a wireless LAN link is formed with another portable terminal, the wireless LAN module 113 may transmit various data according to a user's selection to another terminal or receive the data from another terminal. The wireless LAN module 113 may connect to a server such as a market and download information on various NFC tags and an NFC application for recognition of NFC tags according to control of the controller 170. In an embodiment, the wireless LAN module 113 may transmit a setting list (e.g., the blocking list, the application mapping list, or the like) related with the allowance/restriction of NFC tags to a cloud server or download the setting list from the cloud server through wireless LAN.

The short range communication module 115 represents a module for short range communication. Some examples of the short range communication technology are Bluetooth, RFID, Infrared Data Association (IrDA), Ultra WideBand (UWB), ZigBee, and NFC. In an embodiment, when short range communication is performed with another portable terminal, the short range communication module 115 may transmit data according to a user's selection to another portable terminal or may receive the data from the another portable terminal.

In an embodiment the short range communication module 115 may include an NFC module 116 for NFC. In an embodiment of the present disclosure, the NFC module 116 may sense an approach or a contact of the NFC tag 200, may generate the sensed signal and transmit the signal to the controller 170, and may input information in the NFC tag 200 or read information stored in the NFC tag 200 according to control of the controller 170. The NFC module 116 may maintain an "on" state, or may be turned on according to a user's setting or a user's input.

The location calculation module 115 is a module for obtaining location of the portable terminal 100, and a representative example is a Global Positioning System (GPS) module. The location calculation module 115 may calculate three-dimensional current location information according to latitude, to longitude, and to altitude by calculating distance information from three or more base stations and accurate time information, and applying trigonometry to the calculated information. In an embodiment, the location calculation module 115 may calculate the location information by continually receiving the current location of the portable terminal 100 from three or more satellites. The location information of the portable terminal 100 may be obtained in various methods.

The broadcast reception module 119 receives broadcast signals (e.g., TV broadcast signals, radio broadcast signals, data broadcast signals, or the like) and/or broadcast related information (e.g., information related with a broadcast channel, a broadcast program, or a broadcast service provider) from an external broadcast management server through a broadcast channel (e.g., a satellite channel, a ground wave channel, or the like).

The user input unit 120 generates input data for controlling operation of the portable terminal by a user. The user input unit 120 may include a keypad, a dome switch, a touch pad (e.g., a static voltage/static current touch pad), a jog wheel, a jog switch, or the like. The user input unit 120 may be implemented in the form of a button at an external side of the portable terminal 100, and some buttons may be implemented as a touch panel. When a user input for activation of the NFC function (e.g., an input for controlling a turn-on of the NFC module 116, an input for recognizing the NFC tag, or the like) is received, the user input unit 120 may generate input data according thereto. In an embodiment, the user input unit 120 may receive a user input for additional registration in the blocking list for the NFC tag, or a user input for selection of an NFC application matched with the NFC tag and additional registration in the application mapping list, and generate input data according thereto.

The display unit 130 displays (i.e., outputs) information processed in the portable terminal 100. For example, when the portable terminal 100 is in a calling mode, a screen interface such as a calling-related User Interface (UI) or a Graphical UI (GUI) is displayed. In an embodiment, when the portable terminal 100 is in a video call mode, or in a photographing mode, the display unit 130 displays a photographed or/and received image, or UI or GUI. More particularly, the display unit 130 may display various UIs and GUIs related with the operation of the NFC function. For example, the display unit 130 may provide various screen interfaces for displaying information related with the NFC tag 200 sensed through the NFC module 116, the application list corresponding to the NFC tag 200, the blocking list of the NFC tag, and the application mapping list of the NFC application for each NFC function. When the NFC application for the detected NFC tag is automatically executed, the display unit 130 may display the execution screen of the NFC application and information which is read from the NFC tag through the NFC application according to control of the controller 170. In an embodiment, the display unit 130 may support a screen display by a horizontal mode, a screen display by a vertical mode, and a screen conversion display according to a change between the horizontal mode and the vertical mode according to the rotational direction (or placed direction) of the portable terminal 100.

The display unit 130 may include at least one of a Liquid Crystal Display (LCD), a Thin Film Transistor (TFT) LCD, an Organic Light Emitting Diode (OLED), an Active Matrix OLED (AMOLED), a flexible display, a bended display, and a three-dimensional (3D) display. Here, some displays thereof may be implemented as transparent displays which are a transparent type or an optically transparent type so that an external side may be visible.

In an embodiment, when the display unit 130 and the touch panel that senses a touch operation form a mutual layer structure (hereinafter, referred to as a "touch screen"), the display unit 130 may be used as an input device as well as an output device. The touch panel may be configured to convert a change of pressure applied to a particular part of the display unit 130 or capacitance generated in a particular part of the display unit 130, or the like, into electric input signals. The touch panel may be configured to detect pressure at the time of a touch as well as the touched location and area. When there is a touch input for the touch panel, the corresponding signals are sent to a touch control device (not shown). The touch control device (not shown) processes the signals and then transmits the corresponding data to the controller 170. As such, the controller 170 may recognize which part of the display unit 130 has been touched.

The audio processing unit 140 transmits audio signals which are received from the controller 170 to the speaker (SPK) 141, and performs a function of transmitting audio signals such as voice inputted from the microphone 143 to the controller 170. The audio processing unit 140 may convert voice/sound data into audible sounds and output the sounds through the speaker 141 under control of the controller 170, and may convert audio signals such as voice received from the microphone 143 into digital signals and transmit the digital signals to the controller 170.

The speaker 141 may output audio data which are received from the wireless communication unit 110 at a calling mode, a recording mode, a voice recognition mode, a broadcast reception mode, an NFC mode, and a photographing mode, or are stored in the storage unit 150. The speaker 141 may output sound signals related with the function performed in the portable terminal 100 (e.g., call connection reception, call connection transmission, photographing, music file replay, NFC tag recognition, or the like).

The microphone 143 receives external sound signals in the calling mode, the recording mode, the voice recognition mode, and the photographing mode, and converts the received sound signals into electric sound data. In the calling mode, the converted voice data may be converted into a transmittable form and be outputted to a mobile communication base station through the mobile communication module 111. Various noise removing algorithms for removing noises generated in the process of receiving external sound signals may be implemented in the microphone 143.

The storage unit 150 may store a program for processing and controlling the controller 170, and may temporarily store inputted/outputted data (e.g., NFC tag information, NFC application data, a phone number, a message, audio data, a moving image, an image, an electric book, or the like). The storage unit 150 may also store the use frequency according to an operation of the portable terminal 100 (e.g., the use frequency of the application, the application use frequency for each NFC function, the use frequency of a phone number, a message, a multimedia, or the like), to importance, and to priority. The storage unit 150 may also store data about vibrations and sounds of various patterns which are outputted when a touch is inputted on the touch screen. More particularly, the storage unit 150 may store the blocking list for the NFC tag and the application mapping list for each NFC function according to a user's setting. The example is shown in Tables 1 and 2 below. That is, Table 1 below shows an example of the blocking list, and Table 2 below shows an example of the application mapping list.

TABLE 1

| Blocking list |
| --- |
| NFC function A |
| NFC function B |
| NFC tag 1 |
| NFC tag 2 |
| . . . |

As shown in Table 1 above, a user may set the NFC tag or NFC function for preventing automatic recognition of the NFC tag, and manage the NFC tag or NFC function as a list. Hence, when an NFC tag corresponding to the NFC function A, NFC function B, NFC tag 1, and NFC tag 2 are sensed through the NFC module 116, the recognition of the NFC tag and the automatic execution of the NFC application are not performed. In an embodiment of the present disclosure, information on the NFC tag itself may be used, or information regarding the NFC function may be used. For example, the NFC function may include various services which may be available through NFC, such as a data sharing function through NFC, a traffic fare payment function, a door lock function, and a credit card function. The information (NFC tag information, NFC function information, or the like) of such a blocking list may be corrected, deleted, or added by a user's request.

TABLE 2

| App_mapping_list | |
| --- | --- |
| NFC tag (function) | Application |
| NFC function C, NFC function D | Application 1 |
| NFC tag 3 | Application 2 |
| NFC tag 4, NFC function E | Application 3 |
| . . . | . . . |

As shown in Table 2 above, a user may set an NFC application intended to be used for each NFC function (or NFC tag) and manage the NFC application in a list. At this time, one or more NFC tags (functions) may be mapped with one application. For example, in the case of application 1, two NFC functions may be mapped as in NFC function C and NFC function D, and in the case of application 3, the NFC tag and NFC function may be respectively mapped as in NFC tag 4 and NFC function E. When the NFC tag corresponding to the NFC function C is sensed or the NFC tag corresponding to the NFC function D is sensed through the NFC module 116, application 1 may be automatically executed, or when NFC tag 3 is sensed, application 2 may be automatically executed, and when NFC tag corresponding to NFC tag 4 or NFC function E is sensed, application 3 may be automatically executed through the NFC module 116. Information such an application mapping list (e.g., NFC tag information, NFC function information, application information, or the like) may be corrected, deleted, or added by a user's request.

The storage unit 150 may include at least one of a memory such as a flash memory type, a hard disk type, a micro type, and a card type (e.g., SD card or XD card), a Random Access Memory (RAM), a Static RAM (SRAM), a Read-Only Memory (ROM), a Programmable ROM (PROM), an Electrically Erasable PROM (EEPROM), a Magnetic RAM (MRAM), a magnetic disk type memory, an optical disk type memory. The portable terminal 100 may be linked with the web storage that performs a storage function of the storage unit 150 in Internet for operation.

The interface unit 160 serves as a passage with all external devices connected to the portable terminal 100. The interface unit 160 may receive data transmitted from an external device, may supply power and may transmit the received power to each internal component of the portable terminal 100, or may transmit internal data of the portable terminal 100 to an external device. For example, a wired/wireless headset port, an external charger port, a wired/wireless data port, a memory card port, a port that connects a device including an identification module, an audio input/output port, a video input/output port, an earphone port, or the like may be included in the interface unit 160.

The controller 170 controls overall operation of the portable terminal 100. For example, control related with a voice call, data communication, and a video call may be performed. The controller 170 may include a multimedia module (not shown) for the process of the operation related with the NFC function. In an embodiment of the present disclosure, the multimedia module (not shown) may be implemented within the controller 170, and may be implemented separately from the controller 170.

The controller 170 may perform control related with the execution of the application for each NFC tag (function) in an embodiment of the present disclosure. For example, when the NFC tag 200 is sensed through the NFC module 116, the controller 170 may control the automatic execution of the NFC application for reading the NFC tag 200 sensed according to the blocking list and the application mapping list according to a user's setting, or control an operation such as preventing automatic execution of the NFC application or additionally registering information on the NFC tag 200 to one list.

That is, according to an embodiment of the present disclosure, when the NFC tag 200 is detected through the NFC module 116, the NFC tag may be compared with the blocking list and the application mapping list. In an embodiment, when the NFC tag 200 is included in the blocking list, the controller 170 may block the reading operation for the NFC tag 200, and when the NFC tag 200 is included in the application mapping list, the controller 170 may control to read the NFC tag 200 by executing the NFC application matched with the NFC tag 200.

In an embodiment, when the NFC tag 200 is not included in the blocking list and the application mapping list, the controller 170 may control an output of the setting interface. In an embodiment, when a particular NFC application is selected through the setting interface, the controller 170 may control to match the selected NFC application with the NFC tag 200, and may register the matching result in the application mapping list. When the blocking item is selected through the setting interface, the controller 170 may control to register the NFC tag 200 in the blocking list.

In an embodiment, when the particular NFC application is selected, the controller 170 may control to output the NFC matching interface that confirms whether the selected NFC application is matched with the NFC tag 200. In an embodiment, when it is determined that the selected NFC application is to be matched with the NFC tag, the controller 170 may match the NFC tag 200 with the NFC application and register the matching result in the application mapping list, and may control an execution of the selected NFC application. When it is determined that the selected NFC application is not to be matched with the NFC tag 200, the controller 170 may control an execution of the selected NFC application without registration in the application mapping list.

An operation of the controller 170 will be described later in the operation example of the portable terminal 100 and the controlling method thereof with reference to the attached drawings.

The power supply unit 180 receives external and internal power and supplies power needed at operation of each component under control of the controller 170.

Various embodiments described in the present disclosure may be implemented within a recording medium readable by a computer or a device similar to the computer using software, hardware, or a combination thereof. In hardware implementation, the various embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controls, micro-controllers, microprocessors, and electric units for performing other functions. In some cases, the various embodiments of the present specification may be implemented by the controller 170 itself. In software implementation, the various embodiments such as the procedures and functions described in the present specification may be implemented as separate software modules. Each of the software modules may perform one or more functions and operations described in the present specification.

In an embodiment, when the NFC tag is detected during performance of a particular mode, the recording medium may include a computer-readable recording medium having recorded thereon a program which distinguishes a particular mode when the NFC tag is detected during performance of the particular mode, the controller may read the NFC tag through the NFC application which is being executed if the particular mode is the NFC application mode, may check the NFC tag if the particular mode is the idle mode or normal application mode, may read the NFC tag by executing the NFC application matched with the NFC tag if the NFC tag is the NFC tag of an allowed object, and may maintain the particular mode without executing the NFC application if the NFC tag is an NFC tag of an object to be blocked.

Figure 3:
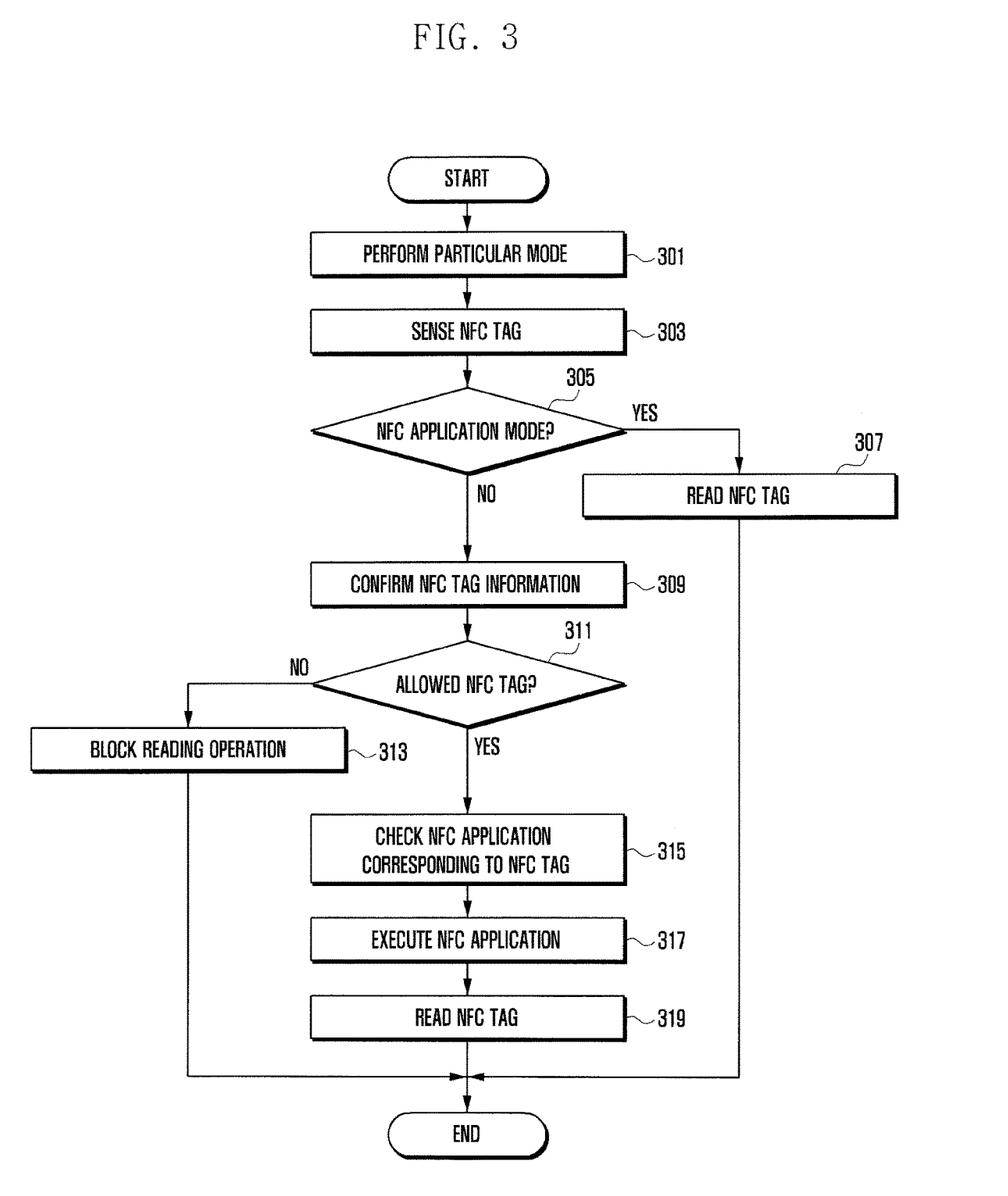
FIG. 3 is a flowchart illustrating a method of operating a function when sensing an NFC tag in a portable terminal according to an embodiment of the present disclosure.

FIG. 3 is a flowchart illustrating a method of operating a function when sensing an NFC tag in a portable terminal according to an embodiment of the present disclosure.

Referring to FIG. 3, the controller 170 may be in a state where the particular mode is being performed according to a user's request at operation 301. For example, the controller 170 may be operating in an idle mode in which the portable terminal 100 is in the idle state. In an embodiment, the controller 170 may be operating in an application mode in which an application requested through the user input unit 120 or the display unit 130 of an input function (e.g., a touch screen, or the like) is executed and an output according thereto is processed. At this time, in an embodiment of the present disclosure, the application mode may be divided into a normal application mode where an application related with a call, a game, a message, web surfing, or the like, is operated, and an NFC application mode where an application related with reading of the NFC tag 200 is operated. That is, according to an embodiment of the present disclosure, the operations may be divided into an operation according to an idle mode and the normal application and an operation according to the NFC application mode.

The controller 170 may sense the NFC tag 200 during execution of a particular mode as described above at operation 303. For example, the controller 170 may receive a sensing signal that senses an approach or contact of the NFC tag 200 through the NFC module 116 during execution of the particular mode.

When sensing the NFC tag 200 during execution of the particular mode, the controller 170 determines whether the particular mode currently under operation is the NFC application mode at operation 305. That is, when the NFC tag 200 is detected, the controller 170 determines whether the current application is being executed (that is, checks whether the particular mode is a mode according to execution of the application), and determines whether the application corresponds to the NFC application if the application is being executed.

If the particular mode is an NFC application mode (e.g., the Yes of operation 305), the controller 170 may recognize the NFC tag 200 based on the NFC application and may read information from the NFC tag 200 at operation 307. In an embodiment, the controller 170 may further control an output of the read information. For example, the controller 170 may control an output of at least one of screen data and sound data according to read information.

If the particular mode is not an NFC application mode (e.g., the No of operation 305), the controller 170 confirms information of the NFC tag 200 at operation 309, and determines whether the NFC tag 200 corresponds to the allowed NFC tag or NFC function at operation 311. For example, the controller 170 may determine whether the NFC tag 200 corresponds to an NFC tag which is to be blocked or an NFC tag which is allowed by comparing the NFC tag or the NFC function corresponding to the NFC tag 200 with a predetermined list (e.g., the blocking list, the application mapping list, or the like).

If the NFC tag 200 is not an allowed NFC tag (or function) (e.g., the No of operation 311), the controller 170 blocks the reading operation for the NFC tag 200 at operation 313. That is, the controller 170 does not perform any action (for example, the execution of the NFC application) for the detection of the NFC tag 200, and may maintain the operation currently under operation, i.e., the execution of the particular mode.

If the NFC tag 200 corresponds to the allowed NFC tag (or function) (e.g., the Yes of operation 311), the controller 170 checks the NFC application which is mapped in advance for the reading of the NFC tag 200 at operation 315, and controls execution of the NFC application at operation 317. That is, the controller 170 may search for the optimal NFC application corresponding to the NFC tag 200 and control the execution of the application.

The controller 170 may recognize the NFC tag 200 through the executed NFC application and may read information from the NFC tag 200 at operation 319. In an embodiment, the controller 170 may further control an output of the read information. For example, the controller 170 may control at least one output among screen data and sound data according to the read information.

Figure 4:
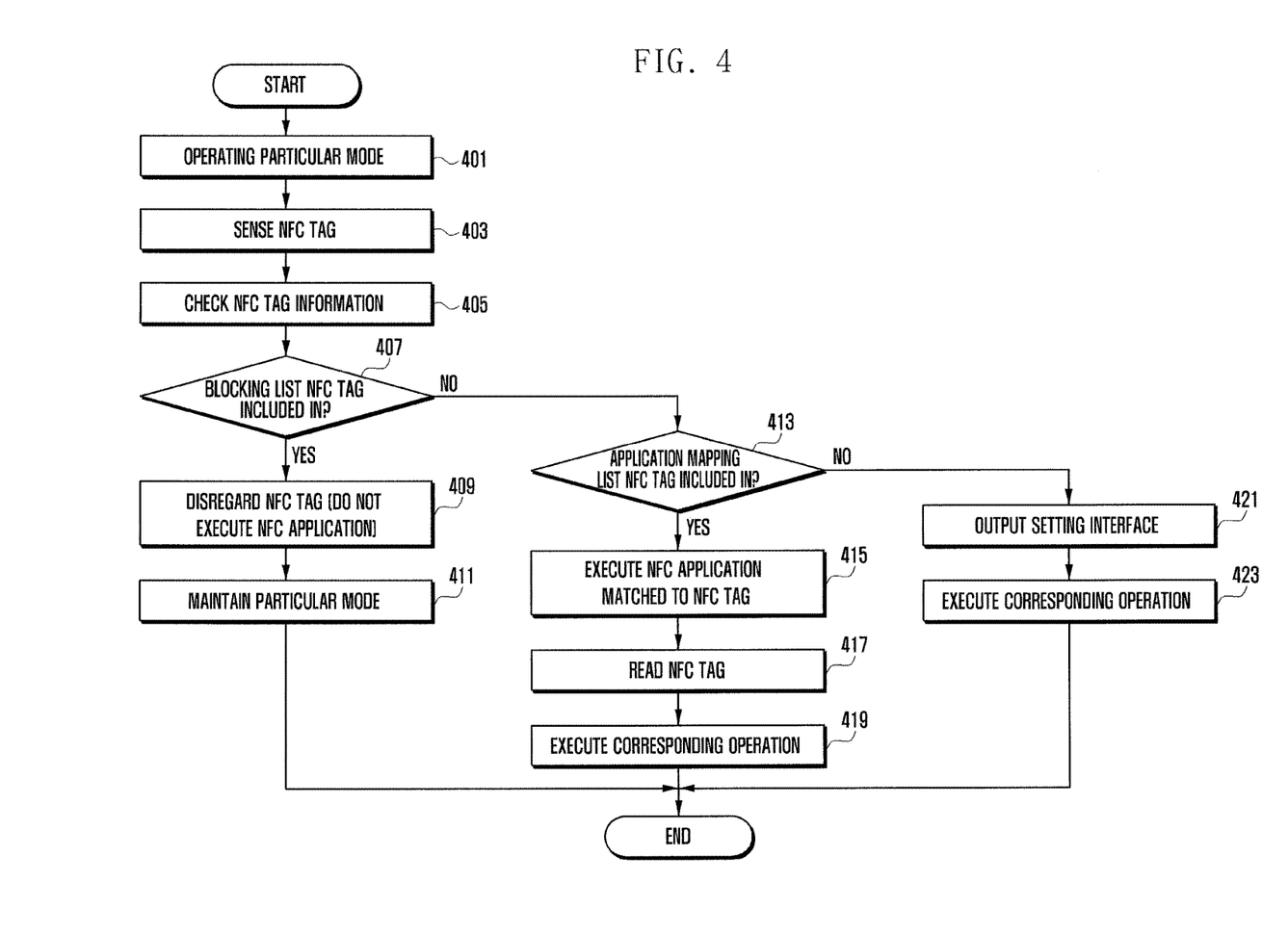
FIG. 4 is a flowchart illustrating a method of operating a function when sensing an NFC tag in a portable terminal according to an embodiment of the present disclosure.

FIG. 4 is a flowchart illustrating a method of operating a function when sensing an NFC tag in a portable terminal according to an embodiment of the present disclosure.

Referring to FIG. 4, the controller 170 may be operating a particular mode according to a user's request at operation 401. In an embodiment, it may be assumed that the particular mode is a mode other than the NFC application mode. That is, in FIG. 4, the particular mode may be an idle mode or a normal application mode.

Likewise, the controller 170 may sense the NFC tag 200 during execution of the particular mode at operation 403. For example, the controller 170 may receive a sensing signal that senses an approach or a contact of the NFC tag 200 through the NFC module 116 during an execution of the particular mode.

When the NFC tag 200 is sensed during the execution of the particular mode, the controller 170 checks the information of the NFC tag at operation 405. In an embodiment, the controller 170 may determine whether the NFC tag 200 corresponds to an NFC tag included in the blocking list or an NFC tag included in the application mapping list, using the information of the NFC tag 200. At this time, the determination operation may include comparing the NFC tag 200 with one of the blocking list and the application mapping list, and comparing the NFC tag 200 with the other of the blocking list and the application mapping list. Hereinafter, it is assumed that the detected NFC tag 200 is first compared with the blocking list. However, the present embodiment is not limited thereto, and the detected NFC tag 200 may be first compared with the application mapping list.

The controller 170 determines whether the NFC tag 200 (or NFC function) is included in the blocking list at operation 407.

If the NFC tag 200 corresponds to the NFC tag included in the blocking list (e.g., the Yes of operation 407), the controller 170 may disregard the detection of the NFC tag 200 at operation 409, and maintain the execution of the particular mode at operation 411. That is, even if the NFC tag 200 is detected, the controller 170 does not process the execution of the NFC application. At this time, the controller 170 may detect the NFC tag 200 and process the operation which identifies whether the detected NFC tag 200 is included in the blocking list in the background.

If the NFC tag 200 corresponds to the NFC tag which is not included in the blocking list (e.g., the No of operation 407), the controller 170 determines whether the NFC tag 200 is included in the NFC tag (or NFC function) of the application mapping list at operation 413.

If the NFC tag 200 corresponds to the NFC tag included in the application mapping list (e.g., the Yes of operation 413), the controller 170 controls execution of the NFC application matched to the NFC tag 200 at operation 415. That is, the controller 170 may search for the optimal NFC application corresponding to the NFC tag 200 and control the automatic execution thereof.

The controller 170 may recognize the NFC tag 200 through the executed NFC application and may read information from the NFC tag 200 at operation 417. In an embodiment, the controller 170 may control the execution of the operation related with the read information at operation 419. For example, the controller 170 may control an output of at least one of screen data and sound data according to the information which has been read from the NFC tag 200.

If the NFC tag 200 corresponds to the NFC tag which is not included in the application mapping list (e.g., the No of operation 413), the controller 170 may control a screen output of the setting interface at operation 421. In an embodiment, the controller 170 may control execution of the operation which is requested through the setting interface at operation 423. Hereinafter, the execution of the user-requested operation using the setting information will be described with reference to FIG. 5.

Figure 5:
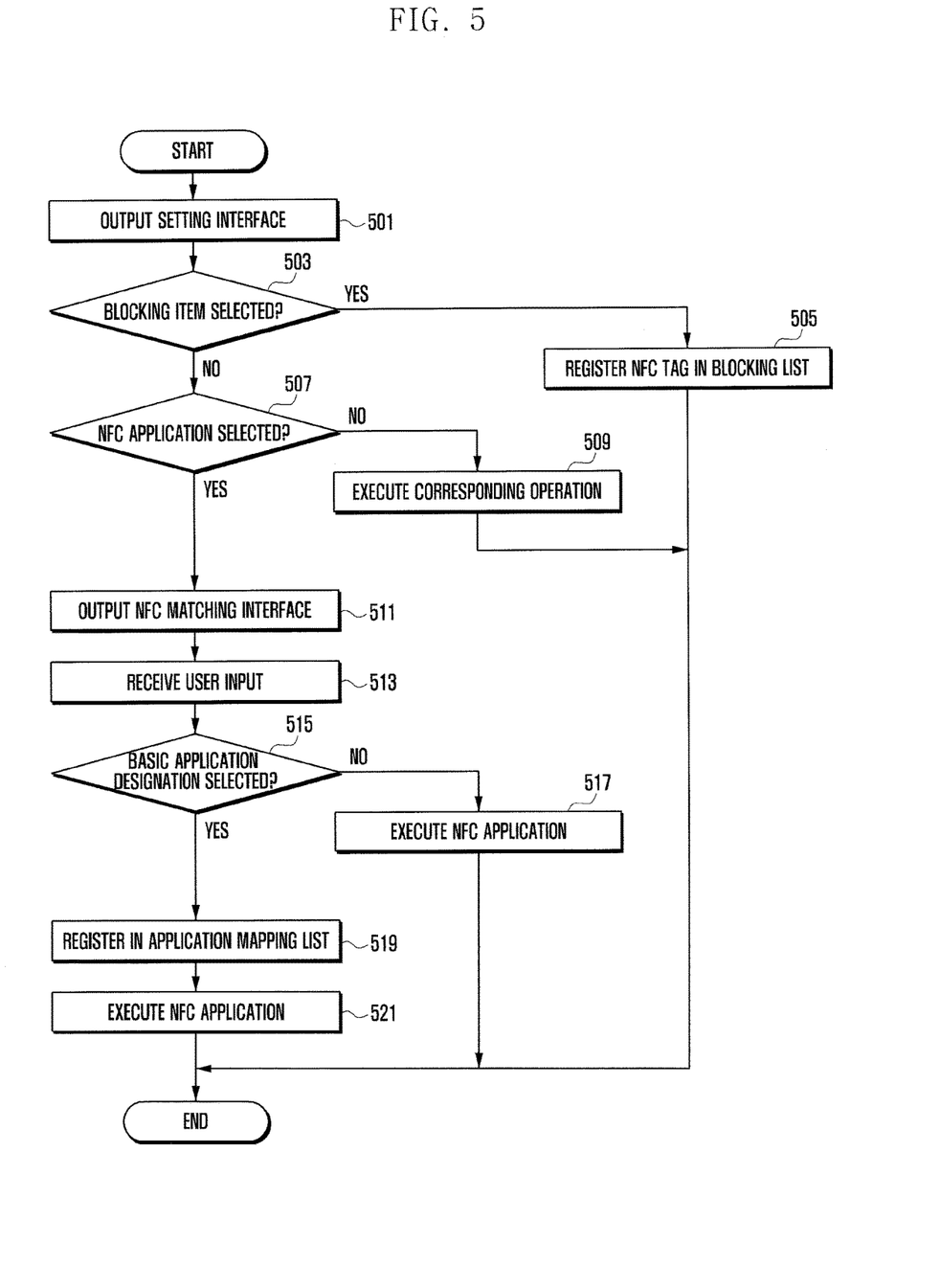
FIG. 5 is a flowchart illustrating a method of setting an allowance or a restriction for an NFC tag using a setting interface in a portable terminal according to an embodiment of the present disclosure.

FIG. 5 is a flowchart illustrating a method of setting an allowance or a restriction for an NFC tag using a setting interface in a portable terminal 100 according to an embodiment of the present disclosure.

Referring to FIG. 5, the controller 170 may output a setting interface which may be set for the detected NFC tag 200 at operation 501. For example, as described with reference to FIG. 4, when the NFC tag 200 corresponds to an NFC tag (or an NFC function) which is not included in both the blocking list and the application mapping list, the controller 170 may output the setting interface which may allow or restrict the NFC tag 200. In an embodiment of the present disclosure, the setting interface may include an application list of NFC applications for operating the NFC function, and a blocking item for registering the detected NFC tag in the blocking list. The screen example of the setting interface operated in an embodiment of the present disclosure will be described below.

The controller 170 determines whether there is an input which selects the blocking item from a user in a state where the setting interface is outputted at operation 503. A user may register the NFC tag 200 in the blocking list in order to prevent the automatic recognition of the NFC tag 200. The registration of the blocking list may be automatically performed by the selection of the blocking item (e.g., a "My NFC tag" button) which is provided through the setting interface.

If the selection of the blocking item is sensed in the setting interface (e.g., the Yes of operation 503), the controller 170 additionally registers the NFC tag 200 in the blocking list at operation 505. Thereafter, the controller 170 may terminate an output of the setting interface and control an output related with the particular mode which has been operated.

If the selection of the blocking item is not sensed in the setting interface (e.g., the No of operation 503), the controller 170 determines whether there is an input for selecting the particular NFC application of the application list from a user at operation 507.

If the selection of the particular NFC application is sensed in the setting interface (e.g., the Yes of operation 507), the controller 170 may output the NFC matching interface for checking whether the selected NFC application is matched for the NFC tag 200 at operation 511. In an embodiment of the present disclosure, the matching interface is for finally checking whether to designate the user-selected NFC application as the basic application for the NFC tag 200, and this process may be omitted in the automatic matching scheme of the NFC tag 200 and the selected NFC application. That is, in the automatic matching scheme, when a particular NFC application is selected from the application list, the above operation 513 may be omitted and the process may directly move to operation 517 which will be described later. In an embodiment, the NFC matching interface may be provided in the form of a pop-up.

The controller 170 may receive an input for designating the particular NFC application as the basic application of the NFC tag 200 or for canceling the designation through the NFC matching interface at operation 513.

If the user input is sensed through the NFC matching interface, the controller 170 determines whether the user input is an input that designates the selected NFC application as the basic application of the NFC tag 200 at operation 515. For example, the controller 170 may determine whether the user input is an input by an approval button which approves the NFC application as the basic application for the NFC tag 200 in the NFC matching interface.

If the user input is not an input which designates the selected NFC application as the basic application (e.g., the No of operation 515), the controller 170 may control execution of the selected NFC application without the registration procedure by matching the NFC tag 200 to the selected NFC application at operation 517. For example, the controller 170 may sense an input by a cancel button that cancels the designation of the NFC application as the basic application for the NFC tag 200 in the NFC matching interface. Then the controller 170 may execute the NFC application which is selected from the application list without a separate registration procedure in response to a user's input of selecting the cancel button, and control operation thereof. For example, the controller 170 may read the NFC tag 200 through the NFC application and control the output of the related information.

If the user input is an input that designates the NFC application as the basic application (e.g., the Yes of operation 515), the controller 170 matches the NFC tag 200 to the selected NFC application, and additionally registers the matching result in the application mapping list at operation 519. In an embodiment, the controller 170 may control execution of the selected NFC application at operation 521. For example, the controller 170 may sense an input by the approval button that approves the NFC application as the basic application for the NFC tag 200 in the matching interface. Then the controller 170 may match the selected NFC application to the application related with the NFC tag 200 (or to the function related with the NFC tag 200) in response to the user's input that selects the approval button, and register the matching result in the application mapping list. In an embodiment, after registering the application mapping list, the controller 170 may execute the selected NFC application and control operation thereof. For example, the controller 170 may control an output of related information by reading the NFC tag 200 through the NFC application.

If there is no user input such as selection of the blocking item or selection of the NFC application in a state where the setting interface is outputted, the controller 170 may control execution of the operation according to a user's request at operation 509. For example, the controller 170 may terminate the output of the setting interface and convert the mode into the particular mode which has been performed.

As described with reference to FIG. 5, according to an embodiment of the present disclosure, if a user input is detected through the setting interface, the controller 170 may determine whether the user input is an input of selecting the blocking item or an input of selecting the NFC application of the application list. In an embodiment, the controller 170 may register the NFC tag 200 in the blocking list, or may match the NFC tag 200 to the selected NFC application to register the matching result in the application mapping list, in response to the user input. As such, a user may conveniently and quickly perform an operation of artificially making a new NFC tag approach the portable terminal 100 and registering the NFC tag in the blocking list or registering the NFC tag in the application mapping list.

In FIG. 5, when the detected NFC tag 200 is not included in the blocking list and the application mapping list, the setting interface is automatically outputted, and the NFC tag 200 is registered in the blocking list or the application mapping list based on the user's input using the setting interface. In an embodiment, though not illustrated in the drawings, a user may register the blocking list or register the application mapping list by the NFC application matching, for at least one NFC tag, at any time, through the setting menu. In an embodiment, according to the present disclosure, the blocking list and the application mapping list may be managed according to the user's selection. For example, a user may perform a correction, an addition, a deletion, or the like, for the NFC tag (or function) within each list, the NFC application for each NFC tag, or the like, through a screen output manipulation of the blocking list or the application mapping list, and a menu operation in each outputted list. That is, the information related with the NFC tag or NFC function within the blocking list may be corrected, added, and deleted, and information related with the NFC application for each NFC tag (or NFC function) within the application mapping list may be corrected, added, and deleted. Hence, the controller 170 may update the blocking list and the application mapping list, which have been considered with reference to Table 1 and Table 2 above, according to a user's setting, and store the updated lists.

Figure 6:
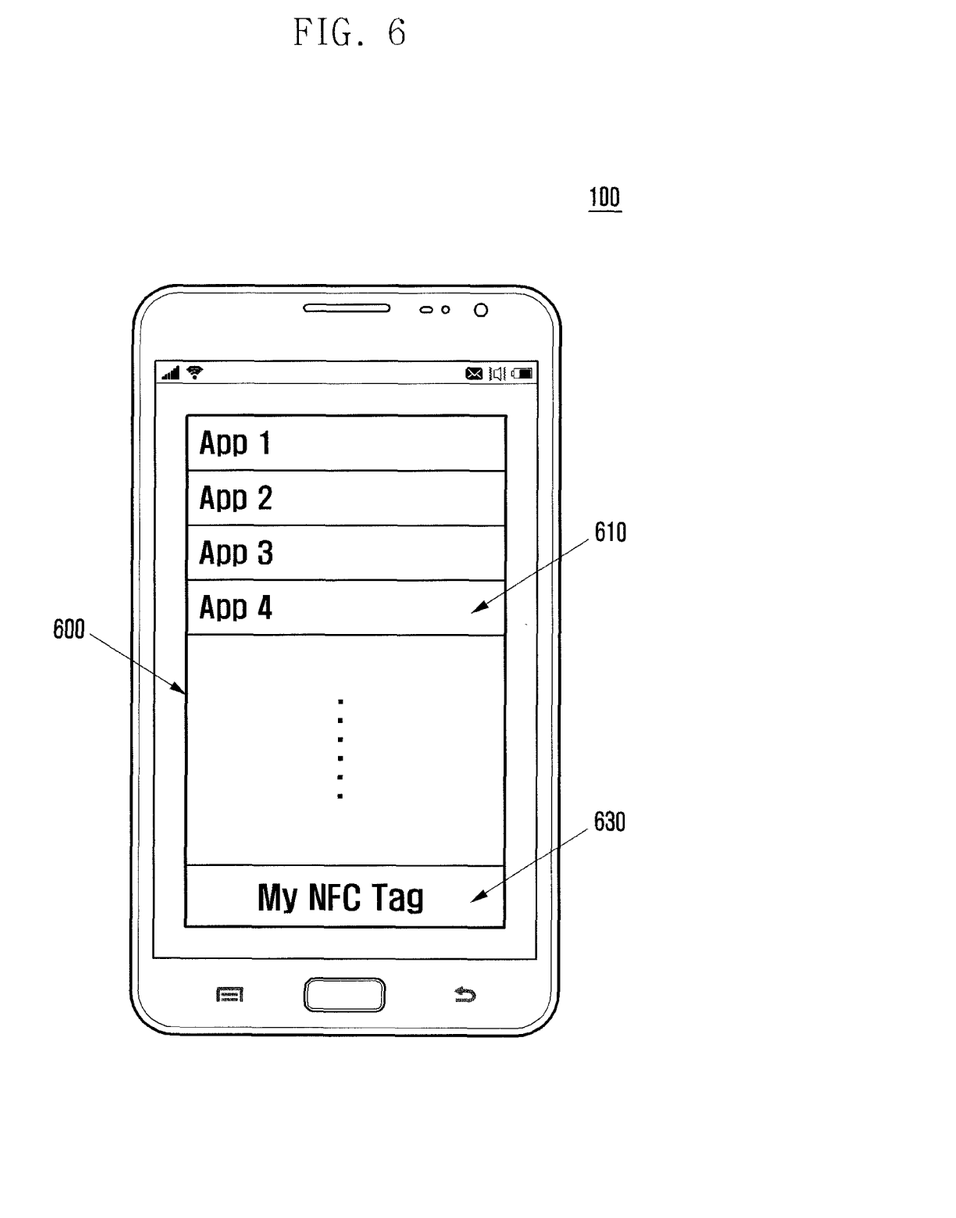
FIG. 6 illustrates a screen example in which a setting interface is provided according to an embodiment of the present disclosure.

FIG. 6 illustrates a screen example in which a setting interface is provided according to an embodiment of the present disclosure.

Referring to FIG. 6, FIG. 6 shows a screen example of the portable terminal 100 in a state where the setting interface 600 is being displayed in the display unit 130 in an embodiment of the present disclosure. In an embodiment of the present disclosure, the setting interface 600 represents an interface for matching the NFC tag 200 to a particular NFC application, registering the matching result in the application mapping list, and managing the matching result as an allowed NFC tag (or function), or registering the NFC tag 200 in the blocking list and managing the registered NFC tag 200 as a restricted NFC tag (or function).

As illustrated in FIG. 6, the setting interface 600 may be divided into a list area 610 where an application list of NFC applications for operating the NFC function is provided, and a blocking area 630 where a blocking item for promptly registering the NFC tag in the blocking list is provided.

The user may automatically register the NFC tag 200 in the blocking list by selecting the blocking item (e.g., marked "My NFC Tag" button) provided to the blocking area 630 of the setting interface 600. That is, when the blocking item of the blocking area 630 is selected from the setting interface 600, the controller 170 may automatically register the NFC tag 200 in the blocking list.

A user may match the NFC tag 200 to the selected NFC application and register the matching result in the application mapping list by selecting one NFC application among applications (e.g., App1, App2, App3, App4, App5, etc.) provided to the list area 610 of the setting interface 600. That is, when the particular NFC application of the list area 610 is selected in the setting interface 600, the controller 170 may match the selected NFC application to the NFC tag 200, and register the matching result in the application mapping list. At this time, when the NFC application is selected according to the setting scheme, the matching result may be automatically registered in the application mapping list or may be selectively registered in the application mapping list through the process that the NFC matching interface is provided, which will be described below.

Figure 7:
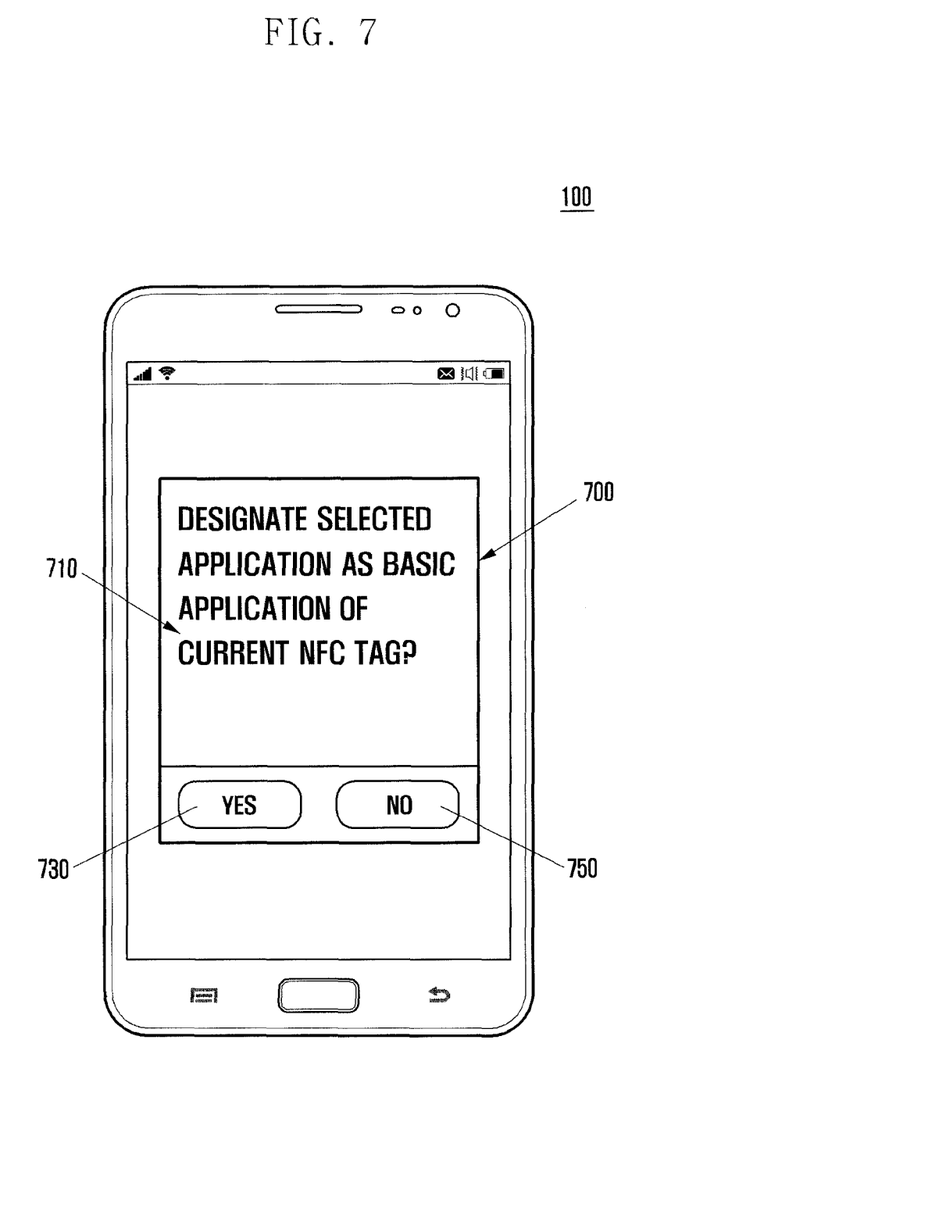
FIG. 7 illustrates a screen example in which an NFC matching interface is provided according to an embodiment of the present disclosure.

FIG. 7 illustrates a screen example in which an NFC matching interface is provided according to an embodiment of the present disclosure.

Referring to FIG. 7, FIG. 7 shows a screen example of the portable terminal 100 in a state where the NFC matching interface 700 is being displayed in the display unit 130 in an embodiment of the present disclosure. In an embodiment of the present disclosure, the NFC matching interface 700 represents an interface for finally confirming whether to designate the NFC application selected by a user as the basic application for the NFC tag 200.

As illustrated in FIG. 7, the NFC matching interface 700 may include a guide area 710 that guides whether to the NFC application selected by a user as the basic application of the NFC tag 200, an approval item 730 (e.g., "YES" button) that approves designation of the NFC application as the basic application, and a rejection item 750 (e.g., "NO" button) that rejects the designation of the NFC application as the basic application. In an embodiment of the present disclosure, the NFC matching interface 700 may be omitted in the automatic matching scheme.

A user may designate the NFC application selected through the setting interface 600 in FIG. 6 as the basic application for the NFC tag 200 before selecting the approval item 730 in the NFC matching interface 700, and register the designation. That is, when the approval item 730 is selected in the NFC matching interface 700, the controller 170 may match the NFC application selected in the setting interface 600 as the basic application for the NFC tag 200, and may register the matching result in the application mapping list. In an embodiment, the controller 170 may match the selected NFC application to the NFC tag 200 and register the matching result, and then read the NFC tag by automatically executing the NFC application.

A user may omit designation of the NFC application selected through the setting interface 600 in FIG. 6 as the basic application for the NFC tag 200 by selecting a rejection item 750 in the NFC matching interface 700, and may execute the NFC application as only an NFC application for reading the current NFC tag 200. That is, a user may temporarily execute the NFC application for only reading the current NFC tag 200. When the rejection item 750 is selected in the NFC matching interface 700, the controller 170 may omit the procedure of matching the NFC application selected in the setting interface 600 to the NFC tag 200 and registering the matching result, execute the selected NFC application, and read the NFC tag 200.

The foregoing various embodiments of the present disclosure may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the disclosure or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. In an embodiment, the program command includes a machine language code created by a complier and a high-level language code executable by a computer using an interpreter. The foregoing hardware device may be configured to be operated as at least one software module to perform an operation of the disclosure, and vice versa.

As described above, according to a method and apparatus for operating an NFC function in a portable terminal suggested in an embodiment of the present disclosure, an unnecessary NFC tag recognition process may be omitted or an optimal application for an approached NFC tag may be automatically selected and executed, according to allowed/restricted information according to a user's setting. As such, an unnecessary recognition process for an NFC tag undesired by a user may be prevented in advance in a portable terminal including an NFC function. In an embodiment, power waste due to unnecessary use of the battery of the portable terminal may be reduced by omitting an unnecessary NFC tag recognition process (e.g., an unnecessary execution of an application for NFC recognition, an unnecessary NFC recognition, an unnecessary output of a related function, or the like). In an embodiment, when an approached NFC tag is an NFC tag corresponding to the allowed NFC function, more accurate read information and related function output for the approached NFC tag are possible by automatically searching for and executing an application optimized for the NFC function, and recognizing the NFC tag and reading the information of the NFC tag by the executed application.

That is, according to the present disclosure, when recognizing an NFC tag of a portable terminal including an NFC function, an unnecessary NFC tag recognition is prevented, and when an authorized (e.g., allowed according to a user's setting) NFC tag is recognized, an application optimized for the NFC tag is automatically executed, thereby enhancing the quality of the NFC service using the NFC tag.

Therefore, according to the present disclosure, user convenience may be improved, and usability, convenience, and competitiveness of a portable terminal may be enhanced by implementing an optimal environment for supporting an NFC service to a user. Embodiments of the present disclosure may be implemented in any form of portable terminal and in other various devices corresponding thereto.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a near field communication (NFC) function in a portable terminal including a NFC module, a storage unit, and a processor, the method comprising:
   detecting, by the processor, an NFC tag during execution of a particular mode;
   if the particular mode corresponds to an idle mode or a normal application mode, comparing, by the processor, the NFC tag with a blocking list and an application mapping list;
   if the NFC tag is an NFC tag which is included in the blocking list, omitting, by the processor, a reading operation of the NFC tag;
   if the NFC tag is an NFC tag which is included in the application mapping list, performing, by the processor, a reading operation of the NFC tag;
   if the NFC tag is not included in the blocking list and in the application mapping list, outputting, by the processor, a setting interface including an application list;
   in response to an input that designates an NFC application selected in the application list as a basic application, matching, by the processor, the NFC tag to the selected NFC application; and
   if the particular mode corresponds to an NFC application mode, performing, by the processor, a reading operation of the NFC tag without the comparing the NFC tag with the blocking list and the application mapping list,
   wherein the setting interface is divided into a list area in which the application list of NFC application for operating the NFC function is provided, and a blocking area in which a blocking item for promptly registering the NFC tag in the blocking list is provided.

2. The method of claim 1, wherein the performing of the reading operation of the NFC tag comprises:
   determining an NFC application matched to the NFC tag through the application mapping list;
   executing the NFC application; and
   performing the reading operation of the NFC tag through the NFC application.

3. The method of claim 1, wherein the omitting of the reading operation for the NFC tag comprises blocking execution of the NFC application for performing the reading operation of the NFC tag.

4. The method of claim 1, wherein the setting interface includes a blocking item for registering NFC applications for NFC application selection in the application list and in the blocking list.

5. The method of claim 4, further comprising:
   registering the matching result in the application mapping list.

6. The method of claim 5, wherein the registering comprises:
   outputting an NFC matching interface that determines whether the selected NFC application is to be matched to the NFC tag when the NFC application is selected;
   performing a reading operation of the NFC tag by executing the selected NFC application after registering the matching result when it is determined that the selected NFC application is to be matched to the NFC tag; and
   performing a reading operation of the NFC tag by executing the selected NFC application without registering the matching result when it is determined that the selected application is not to be matched to the NFC tag.

7. The method of claim 4, further comprising:
   registering the NFC tag in the blocking list when the blocking item is selected in the setting interface.

8. The method of claim 1, wherein, if the NFC tag is detected in the NFC application mode, an NFC application currently being executed performs the reading operation of the NFC tag.

9. A method of operating a near field communication (NFC) function in a portable terminal including a NFC module, a storage unit, and a processor, the method comprising:
   detecting, by the processor, an NFC tag during an execution of a particular mode;

reading, by the processor, the NFC tag through an NFC application currently being executed if the particular mode corresponds to an NFC application mode;

when the particular mode does not correspond to the NFC application mode, checking, by the processor, the NFC tag if the particular mode corresponds to an idle mode or is a normal application mode;

determining, by the processor, whether the NFC tag is an NFC tag of an allowed object or is an NFC tag of a blocked object;

reading, by the processor, the NFC tag by executing an NFC application which is matched to the NFC tag if the NFC tag is the NFC tag of the allowed object;

maintaining, by the processor, the particular mode without executing the NFC application if the NFC tag is the NFC tag of the blocked object;

if the NFC tag is not the NFC tag of the allowed object and the NFC tag of the blocked object, outputting, by the processor, a setting interface including an application list; and in response to an input that designates an NFC application selected in the application list as a basic application, matching, by the processor, the NFC tag to the selected NFC application, wherein the setting interface is divided into a list area in which the application list of NFC application for operating the NFC function is provided, and a blocking area in which a blocking item for promptly registering the NFC tag in a blocking list is provided.

10. The method of claim 9, further comprising:
blocking execution of an NFC application for reading the NFC tag when the NFC tag is included in the blocking list.

11. The method of claim 9, wherein the reading of the NFC tag comprises:
searching for an NFC application which is matched to the NFC tag in the application mapping list, executing the searched NFC application, and reading the NFC tag if the NFC tag is included in the application mapping list.

12. A portable terminal comprising:
a near field communication (NFC) module configured to sense an approach of an NFC tag and to read information stored in the NFC tag;
a storage unit configured to store a plurality of NFC applications, a blocking list, and an application mapping list; and
a processor configured to:
detect execution of a particular mode,
if the particular mode corresponds to an NFC application mode, read the NFC tag through an NFC application currently being executed,
if the particular mode corresponds to an idle mode or a normal application mode, compare the NFC tag with the blocking list and with the application mapping list,
omit a reading operation of the NFC tag if the NFC tag is included in the blocking list,
read the NFC tag by executing the NFC application matched to the NFC tag if the NFC tag is included in the application mapping list,
if the NFC tag is not included in the blocking list and in the application mapping list, output a setting interface including an application list, and
in response to an input that designates an NFC application selected in the application list as a basic application, match the NFC tag to the selected NFC application,
wherein the setting interface is divided into a list area in which the application list of NFC application for operating a NFC function is provided, and a blocking area in which a blocking item for promptly registering the NFC tag in the blocking list is provided.

13. The portable terminal of claim 12, wherein the processor is further configured to:
register a matching result in the application mapping list, and
register the NFC tag in the blocking list if the blocking item is selected through the setting interface.

14. The portable terminal of claim 13, wherein the processor is further configured to:
determine whether a selected NFC application is to be matched to the NFC tag if the NFC application is selected,
match the NFC tag to the NFC application,
register the matching result in the application mapping list, if it is determined that the selected NFC application is to be matched to the NFC tag, and
execute the selected NFC application without registering a matching result in the application mapping list when it is determined that the selected NFC application is not to be matched to the NFC tag.

15. The portable terminal of claim 14, wherein the portable terminal includes a display configured to output a setting interface for selecting an NFC application.

16. A non-transitory computer-readable recording medium having recorded thereon a program configured to:
determine a particular mode when a near field communication (NFC) tag is detected during an execution of the particular mode;
read the NFC tag through an NFC application currently under execution if the particular mode corresponds to an NFC application mode;
when the particular mode does not correspond to the NFC application mode, check the NFC tag if the particular mode corresponds to an idle mode or a normal application mode;
read the NFC tag by executing the NFC application matched to the NFC tag if the NFC tag is an NFC tag of an allowed object;
maintain the particular mode without executing the NFC application if the NFC tag is an NFC tag of a blocked object; and
if the NFC tag is not the NFC tag of the allowed object and the NFC tag of the blocked object, output a setting interface including an application list, and
in response to an input that designates an NFC application selected in the application list as a basic application, match the NFC tag to the selected NFC application,
wherein the setting interface is divided into a list area in which the application list of NFC application for operating a NFC function is provided, and a blocking area in which a blocking item for promptly registering the NFC tag in a blocking list is provided.

* * * * *